May 5, 1942.  J. G. HOOP  2,282,226
CONTROL MEANS FOR INDUSTRIAL HEAT-TREATING FURNACES
Filed Sept. 9, 1941
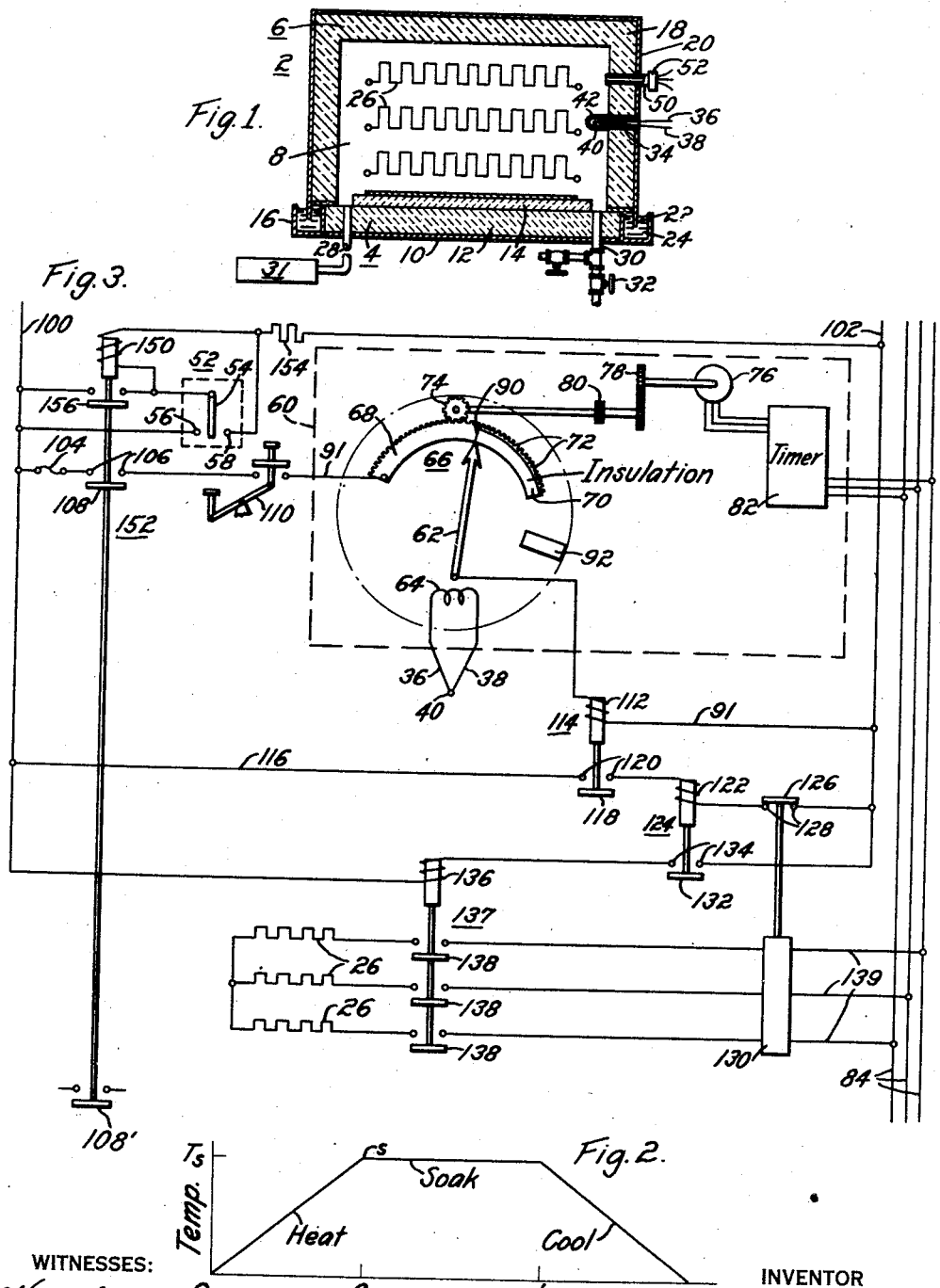
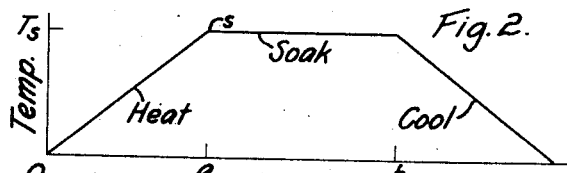
WITNESSES:
Wm. B. Sellers.
Bernard L. Zangwill
INVENTOR
John G. Hoop.
BY O. B. Buchanan
ATTORNEY Patented May 5, 1942

2,282,226

UNITED STATES PATENT OFFICE 2,282,226

CONTROL MEANS FOR INDUSTRIAL HEAT-TREATING FURNACES

John G. Hoop, Pittsburgh, Pa., assignor to Westinghouse Electric & Manufacturing Company, East Pittsburgh, Pa., a corporation of Pennsylvania Application September 9, 1941, Serial No. 410,132

6 Claims. (Cl. 13—24)

My invention relates, generally, to heat-treating furnaces, and more specifically relates to heat-treating furnaces in which a charge is to be heat-treated by a process which involves bringing the charge from a relatively lower temperature to a relatively higher temperature at a controlled rate of increase in temperature, the charge being enveloped during the heat-treating process by a gas which is either inert to the charge, or will react therewith in a desired manner or manners.

In many types of heat-treating furnaces, and particularly in furnaces which have large heat-treating chambers, the heat-treatment is carried out while the heat-treating chamber is permeated with a controlled atmosphere. Such a controlled atmosphere may have a relatively high cost of production, and it is desirable, therefore, to conserve its use during the heating and cooling of the charge. My invention has this as one of its objects.

Electrical furnaces in which a predetermined heat-treating program or cycle is to be carried out, which program may involve, for example, slow heating from a starting temperature, say ambient temperature, to a higher soaking temperature, and slow cooling to a lower temperature at which the charge may be handled, or is to be further treated, usually have the power supplied to the heating elements of the furnace varied, under control of a temperature-responsive means, either by induction regulators or tap changing transformers, or by intermittent energization and deenergization of the heating-resistors, commonly known as the "on-off" method of heat control. These arrangements are well known, but the former is considerably more costly than the latter. However, in gas-permeated furnaces, particularly those using liquid seals between separable furnace parts, the "on-off" type of heating control has the disadvantage that the application of the heat causes a rapid expansion of the controlled atmosphere in the heat-treating chamber, increasing the gas-pressure, so that some of the controlled atmosphere must be released to prevent it from being forced through gas leaks in the furnace, or with furnaces using liquid seals to prevent blowing liquid out of the liquid seal used between the separable wall structure parts of the furnace.

It is an object of my invention to provide in a heat-treating furnace, a gas-pressure control means enabling the use of the relatively simple and inexpensive "on-off" type of temperature control for controlling the heat-treating cycle, without the disadvantages of a loss of controlled atmosphere, or contamination thereof, or destructive effects on the liquid seal, if one be used between separable parts of the furnace wall structure.

In accordance with the application of my invention to electric furnaces, a pressure-responsive means is incorporated into the control of the energy supply to the heating-resistors, which pressure-responsive means prevents the application of heating energy to the heating-resistors when the pressure of the gas, or controlled atmosphere, therein exceeds any preselected value. This pressure-responsive means is used in conjunction with a temperature-responsive means which controls the heating or cooling rate of the charge within the furnace.

Other objects, innovations, methods, and features of my invention, in addition to those briefly described above, will be apparent from the following description thereof, which is to be taken in connection with the accompanying drawing, in which the invention is symbolically illustrated for the sake of simplicity, clarity of description and illustration.

In the drawing,

Figure 1 is a schematic cross-sectional view of a heat-treating furnace, having separable outer wall structure parts, to which my invention may be applied, Fig. 2 is a graphical view of a heat-treating cycle which can be carried out in the furnace of Fig. 1; and Fig. 3 is a symbolic wiring diagram of a control means for obtaining a heating cycle in accordance with Fig. 2, while utilizing the features of my invention.

The furnace of Fig. 1 is illustrative of any suitable heat-treating furnace to which my invention may be applied. The furnace illustrated is one having separable top and bottom structures, such as for example, a bell furnace, and is indicated in its entirety by the reference numeral 2. The bell furnace comprises an outer wall structure comprising a base part 4 and a heating bell part 6 which can be removably placed on the base part 4, and cooperates therewith to define an enclosed heat-treating chamber 8.

The furnace may be either round or rectangular or any other desired shape, but in this instance the furnace is intended to be of rectangular type. Consequently, the base part 4 comprising a rectangular gas-impervious metal base plate 10 supported on any suitable framework or foundation, and carrying heat insulating and refractory brickwork 12 supporting a central charge-supporting hearth 14. The base part 4 is further provided with a peripheral trough means comprising a U-shaped sealing trough 16 gas-tightly secured around the base plate 10. The heating bell part 6 comprises any suitably constructed heat insulating and refractory brickwork 18 encased by an outer gas-tight metal casing 20 to which is gas-tightly secured, or made integral therewith, a depending peripheral flange 22 which fits inside the sealing trough 16 when the heating bell is lowered about a charge on the hearth 14, the heating bell being provided with suitable eye-bolts, or the like, for raising or lowering the bell, as is customary. The seal between the heating bell 6 and the base part 4 of the furnace is completed by a sealing liquid 24 in the trough 16.

For heating the heat-treating chamber 8 and, consequently, any charge resting on the hearth 14, the furnace is provided with any suitable temperature changing means for changing the temperature of the heat-treating chamber, such as, for example, radiant gas-fired tubes or electrical heating-resistors 26 supported on the heating bell and having suitable gas-tight terminals on the outside thereof.

Controlled atmosphere is fed to the heat-treating chamber 8 through a gas inlet pipe 28 and may be withdrawn, or vented, through a gas outlet pipe 30, the gas inlet and gas outlet pipes passing gas-tightly through the base part 4 on opposite sides of the charge-supporting hearth 14. I have indicated the gas inlet pipe 28 as connected to any suitable controlled atmosphere source or generating system 31, and, if desired, the gas outlet pipe 30 may be return-connected to the gas system to provide for recirculation of the gas. The controlled atmosphere, which may be any suitable gas, a common gas for heat-treating silicon sheet steel in a furnace of the type described including nitrogen, is fed to the heat-treating chamber 8 in order to gas-permeate the chamber and to gas-envelope a charge on the hearth 14. The gas outlet pipe 30 also provides a convenient means for permitting a small quantity of the gas to be constantly withdrawn from the gas system in order to maintain the atmosphere within the heat-treating chamber 8 clean and pure; and a gas valve 32 may control the discharge rate of this gas.

A temperature-responsive means 34, comprising dissimilar wires 36 and 38 joined at a junction 40 within the heating chamber, extends through the heating bell 6, preferably surrounded by a closed metal-refractory tube 42 gas-tightly secured to the casing 20 to prevent gas-leakage.

A small pipe 50 passes through a wall of the furnace, for example, a wall of the bell, being gas-tightly secured to the bell casing 20. The pipe 50 has an open end exposed to the interior of the heat-treating chamber 8 and has its other end closed by a pressure-responsive switch-device 52 gas-tightly secured thereto. The switch-device 52 has a contactor 54 (see Fig. 3), movably responsive to the gas-pressure in the heat-treating chamber 8. The switch-device 52 has a low-pressure contact 56 and a high-pressure contact 58, the contactor 54 being movable between the contact 56, which is engaged by the contactor 54 when the pressure of the gas in the heat-treating chamber 8 is below a certain value, and the contact 58 which is engaged by the contactor 54 when the pressure of the gas is above a certain higher value. Pressure-responsive switches of this type are well known, but I prefer to use one in which the contactor 54 must move for some adjustable distance after leaving one of its cooperating contacts before it engages the other contact so that there is an adjustable intermediate range of gas-pressures, generally indicative of proper operating gas-pressure conditions in the furnace, during which the contactor 54 is out of engagement with either contact.

When a charge is to be brought from a relatively low temperature up to a high temperature at a predetermined rate, or vice versa, the change in temperature may change the gas pressure within the heat-treating chamber 8 beyond tolerable limits; and if the relatively low-cost "on-off" system is used for controlling the application of energy to the heating-resistors 26, rapid and excessive changes in gas pressures may be caused by the energization and deenergization of the heating-resistors 26. To avoid such undesirable gas-pressure conditions, the pressure-responsive switch-device 52 is superimposed on any suitable "on-off" control equipment. Such "on-off" control equipment is common and various forms are known to those versed in the art. However, in Fig. 3 an equivalent structure has been symbolically shown in a form much simpler than the somewhat involved and complicated control equipment on the market, but which it suitable for illustrating the function of such mechanisms. This symbolic arrangement is contained within the rectangle 60, and is shown as comprising a pivoted contact pointer 62 having a position determined by the temperature within the heat-treating chamber 8 through connection of the wires 36 and 38 of the temperature-responsive means 34 to a suitable pointer-moving means 64. The pointer 62 is in wiping engagement with a movable arcuate segment 66 consisting of a conducting portion 68 and an insulating portion 70. The segment 66 is concentric to the pivot of the contact pointer 62, which is movable in the arc of a circle having this pivot point as its center.

The segment 66 is provided with rack teeth 72, and a gear 74 meshes with the rack teeth, the gear being driven at a substantially constant speed by a motor 76. A variable speed reducing gear 78 and a slip clutch 80 may be provided between the driving connection of the motor 76 and the gear 74. A timer 82 controls the direction of rotation of the motor 76 and also the periods in which it is energized, the motor 76 being connectible to the three-phase power leads 84 through the timer 82.

If it is assumed that a charge on the charge-supporting hearth 14 is to have its temperature raised at a uniform predetermined rate, the gear 74 is rotated at some predetermined ratio thereto to drive the segment 66 at a predetermined rate, in a clockwise direction. If, now, it is assumed that energy can be supplied to the heating-resistors 26 to raise the temperature of the heat-treating chamber 8, the pointer 62 will also move clockwise under the action of the temperature-responsive means 34, and so long as the movement of the pointer, which is responsive to the temperature within the heat-treating chamber 8, does not move faster than the segment 66, it will be in engagement with the conducting portion 68 of the segment 66. In such engaging position, the heating-resistors 26 can be energized if the gas pressure in the furnace is not excessive, as will later be described. If, however, the temperature of the heat-treating chamber 8 should rise faster than the selected desired rate, then the pointer 62 will move faster than the segment 66, which moves in proportion to the desired heating rate, so that the pointer will leave the conducting portion 68 and contact the insulating portion 70. This will cause the energy supply circuit to the heating-resistors 26 to be interrupted, thereby deenergizing them, and stopping the supply of heating energy to the heat-treating chamber 8. The clockwise movement of the pointer slows down, and may even stop or reverse if the chamber 8 cools somewhat. In time, the conducting portion 66 will overtake the pointer 62 and reclose the circuit between the conducting portion 68 and pointer 62 to cause the reapplication of energy to the heating-resistors 26, and thus it is apparent that the increase in temperature within the heat-treating chamber 8 can take place at a substantially constant rate under control of the "on-off" system represented within the rectangle 60.

Fig. 2 shows a heating program for heat-treating a charge. Assuming that the initial temperature of the charge is represented by the origin, and assuming that the charge is to be heated to a soaking temperature $T_s$ in a time $a$, the travel of the segment 66 is adjusted in accordance with the slope of the line $Os$, and the timer 82 is adjusted to maintain the motor 76 energized for a time $Oa$. When the temperature $T_s$ is reached, representative of the soaking temperature at which the charge is to be soaked for a time $ab$, the dividing line 90 between the conducting portion 68 and the insulating portion 70 of the segment 66 should be at a point representative of the temperature $T_s$. However, the timer 82 may be made operative for energizing the motor 76 for a time slightly greater than the time $Oa$, in which case an adjustable stop 92 may be provided in the path of the movable segment 66 for stopping movement of this segment when the divided line 90 reaches its limiting position, the slip clutch 80 permitting the motor to continue the run for the slightly excess time period. By adjusting the position of the stop 92, the soaking temperature $T_s$ can be varied, and the adjustable speed reducing gearing 78 can be adjusted to determine the rate at which the charge in the heat-treating chamber 8 is to be brought up to the soaking temperature.

During the soaking period, the pointer 62 may oscillate back and forth across the dividing line 90, stationary at a position indicative of the soaking temperature $T_s$. As the chamber 8 cools the pointer moves counterclockwise to engage the conducting segment 68, reapplying the heating energy to raise the temperature of the heating chamber to the value $T_s$, and when the temperature goes beyond this point, the pointer engages the insulating portion 70 and deenergizes the heating units to stop the application of heat to the chamber 8.

For cooling the charge after a time $Ob$, the timer 82 reenergizes the motor 76, but causes it to run in a reverse direction by, for example, reversal of two of the three phase connections to the motor, so that the segment 66 now moves counterclockwise at a rate in accordance with the rate of which it is desired to cool the charge, and the pointer 62 will tend to follow the movement of the segment in accordance with the principles of operation previously described.

In accordance with my invention, pressure-responsive means, including the switch-device 52 is superimposed on the control of the heating-resistor by the pointer 62 and the segment 66.

A heating control circuit 91, connected across power conductors 100 and 102, includes a thermal fuse 104, preferably placed in the heat-treating chamber 8 to prevent excessive temperatures therein, a pair of separated contacts 106 adapted to be bridged by a relay contactor 108 under control of the switch-device 52, a start-stop switch 110, the conducting portion 68 of the segment 66, the pointer 62 when engaging the conducting portion 68, and a coil 112 of a relay 114. The relay 114 controls an auxiliary circuit 116 including a contactor 118 raised by energization of the coil 112, to bridge a pair of contacts 120 for energizing the coil 122 of a relay 124. The circuit 116 may also include a normally closed contactor 126 bridging a pair of contacts 128 of an overload device 130 in the heating-resistor energizing circuit. The relay 124 includes a normally open contactor 132 adapted to engage a pair of contacts 134 upon energization of the coil 122, to close an obvious circuit to an operating coil 136 of a heavy duty circuit maker and breaker 137 having normally open contacts 138, which, in closed position, close the energizing circuit 139 from the three-phase power leads 84. This energizing circuit 139 passes through the overload protective device 130 to the heating-resistors 26, connected in star.

In the operation of the system thus far described and assuming that the start-stop switch 110 is closed to starting position, and that the contactor 108 bridges its associated contacts 106, which represents satisfactory gas-pressures in the furnace, it is evident that if the pointer 62 is in engagement with the conducting portion 68 of the segment 66, the coil 112 of the relay 114 will be energized. Energization of the coil 112 causes the normally open contactor 118 to engage its associated contacts 120, thereby completing the circuit between the power conductors 100 and 102, which includes the coil 122 of the relay 124. Energization of the coil 122 causes the normally open contactor 132 to bridge its associated contacts 134 to connect the operating coil 136 across the power conductors 100 and 102, which causes the contactors 138 to move to circuit making position for closing the energizing circuit 139, thereby energizing the heating-resistors 26.

The application of heat to the heating chamber 8 causes the temperature to rise so that the pointer 62 moves clockwise. However, the heating-resistors 26 are usually designed to heat the heat-treating chamber 8 at a rate faster than the rate at which the charge is to be brought up to temperature, so that the heat-treating chamber tends to heat up faster than the desired rate. Consequently, the pointer 62 will move faster than the segment 66, ultimately leaving the conducting portion 68 of the segment 66, and engaging the insulating portion 70 so that the circuit including the operating coil 112 of the relay 114 is interrupted, causing it to release its contactor 118. Release of the contactor 118 interrupts the circuit to the operating coil 122 causing it to release its contactor 132, and thereby interrupting the energizing circuit for the operating coil 136. Deenergization of the operating coil 136 cause it to release its circuit maker contactors 138 thereby deenergizing the heating-resistors 26.

At the start of the heating cycle, the switch-device 52 is adjusted so that the contactor 54 will leave the low-pressure contact 56 when the gas-pressure in the furnace goes above a selected value, and will engage and remain in engagement with the high pressure contact 58 when the gas-pressure is above a selected value somewhat higher than that for which the contact 56 is set.

Assuming a heating cycle is to be carried out, and that the gas-pressure in the furnace is such that the contactor 54 is on its contact 56, a circuit is completed from the power conductor 100 to the contact 56, through the contactor 54, through the coil 150 of a relay 152, through a protective current-limiting resistor 154, to the other power conductor 102. Energization of the coil 150 raises the normally open contactor 108, whereby the heating control circuit 91 is made operable. Energization of the coil 150 also completes an obvious holding circuit for the relay 152, through its own normally open contactor 156. So long as the control circuit 91 is placed in operable condition by engagement of the contactor 108 on its contacts 106, the application of energy to the heating-resistors 26 is under control of the pointer 62 and the segment 66 of the "on-off" equipment. Under the assumed conditions, the relay—coils 112, 122 and 136 will be energized, and the energizing circuit to the heating-resistors 26 completed.

If, upon energization of the heating means in the chamber 8, the gas pressure in the chamber 8 should become so great that the contactor 54 of the pressure-responsive switch-device 52 leaves its contact 56 and moves to the right in Fig. 3, no change will occur immediately since the contactor 108 is held in closed position against its contacts 106, because the holding circuit for the coil 150 is completed through the contactor 156. When the contactor 54 reaches the contact 58, indicative of a predetermined gas-pressure, the coil 150 is shorted through a branch circuit including the contactor 54 and the contact 58, engaged thereby, the resistor 154 limiting the current-flow through the shorting circuit. This causes the release of the contactors 108 and 156.

Release of the contactor 108 interrupts the heating control circuit 91, regardless of the position of the pointer 62, and the relays it controls, to effect the deenergization of the heating-resistors 26, which are energizable only when the control circuit 91 is made operable by engagement of the contactor 108 and contacts 106. As the gas pressure begins to decrease, the contactor 54 moves to the left, and when the gas pressure has decreased sufficiently so that the contactor 54 engages the contact 56, the relay 152 is again energized, causing the engagement of the contactor 108 with its contacts 106, to render the control circuit 91 again operable for controlling the energization of the heating-resistors 26. If the temperature-responsive means 34 is calling for the application of heat at this time, and the pointer 62 is in engagement with the conducting portion 68 of the segment 66, the heating-resistors will be energized. If, however, the temperature of the heat-treating chamber is still above that which is called for by the line of Fig. 2, the heating-resistors will not be energized because the pointer 62 will be in engagement with the insulating portion 70 of the segment 66 at the time.

From the foregoing, it is evident that the heating-resistors can be energized in response to the thermo-responsive means only while the gas-pressure in the heat-treating chamber 8 is below a set value, which is determined by the setting of the switch-device 52.

The switch-device 52 can be provided with means for adjusting the position of the contacts 56 and 58, and also for adjusting the distance between them to prevent continuous fluttering contact of the contactor 108 on its contacts 106. The holding circuit for the relay 152, which includes the contactor 156, maintains the contactor 108 in closed position against its contacts 106 when the contactor 54 is moved from a position against the contact 56 to a position against the contact 58. In the reverse movement of the contactor 54, the circuit to the relay 152 is kept open until the contact 56 is engaged by the contactor 54. Consequently, there can be no "hunting," that is, rapid intermittent energization and deenergization of the heating means when the pressure of the gas in the heat-treating chamber 8 is such that the contactor 54 is just about to leave either the contact 56 or the contact 58.

If a multi-zone heating control is used in a furnace, a single pressure-responsive means may be used to control all of the individual zone controls, a contactor 108' actuated by coil 150 and connected in a system such as that embracing contactor 108, being provided for each zone control.

While I have shown my invention in a symbolic form of elements, it is evident that many modifications and equivalents may be used. The particular details of the pressure-responsive device or the temperature-responsive means, or both, may take various forms known to the art, and the apparatus and connections which are schematically shown in Fig. 3, may be varied considerably.

I claim as my invention:

1. A heat-treating furnace comprising, in combination, a wall structure defining a substantially enclosed heat-treating chamber, variably-operable temperature-changing means for said heat-treating chamber, temperature-responsive means responsive, in some manner, to the temperature in said heat-treating chamber, pressure-responsive means responsive, in some manner, to gas-pressure in said heat-treating chamber, and means controlled jointly by said temperature-responsive means and said pressure-responsive means, for controlling the variable operation of said temperature-changing means.

2. The combination with a heat-treating furnace comprising an outer wall structure defining a substantially enclosed heat-treating chamber, gas-inlet and gas-outlet means for said heat-treating chamber for permeating said chamber with a controlled atmosphere, heating means for heating said heat-treating chamber, and control means, comprising temperature-responsive means, for variably energizing said heating means for selectively controlling the temperature rise of said heat-treating chamber during a heating-up part of a heat-treating cycle: of means responsive in some manner, to gas-pressure in said heat-treating chamber, the last said means causing said control means to decrease the energization of said heating means when the gas-pressure is above a certain value.

3. A device of the class described, comprising an outer wall structure of separable wall parts, the wall parts cooperating, when together, to define a substantially enclosed heat-treating chamber, said wall parts having outer metal casing means, and cooperable sealing means, containing liquid, for gas-tightly sealing said heat-treating chamber, heating means carried by said wall structure for heating said heating chamber; means for permeating said heating chamber with a controlled atmosphere; control means, including temperature-responsive means responsive to the temperature of said heat-treating chamber, for controlling the application of energy to said heating means whereby the heating cycle in said heat-treating chamber over a period of time is controlled; said control means, when operable, energizing and deenergizing said heating means in accordance with the temperature response of said temperature-responsive means; and means responsive, in some manner, to the gas-pressure in said heat-treating chamber for controlling the energizing operations of said control means on said heating means.

4. A heat-treating bell-type furnace comprising, in combination, a furnace base provided with a peripheral trough means adapted to hold a liquid, a removable heating bell for said base, cooperating therewith to provide a heat-treating chamber, said heating bell having an outer metal casing provided with a peripheral flange adapted to be disposed in said trough means to provide a sealing means for gas-tightly sealing said chamber, electric heating means in said furnace for heating said heating chamber, control means operable for energizing and deenergizing said electrical heating means for controlling the temperature conditions of said heating chamber, and means responsive, in some manner, to the gas-pressure in said heating chamber, for controlling the operations of said control means for permitting heating of said heating chamber by said heating means only when the gas-pressure is below a certain value.

5. A heat-treating furnace comprising a wall structure defining a substantially enclosed heat-treating chamber, means for supporting a charge in said chamber, means for permeating said heat-treating chamber with a controlled atmosphere, heating means for said heat-treating chamber, heating-control means for energizing and deenergizing said heating means, thereby varying the gas-pressure in said heat-treating chamber, and means responsive, in some manner, to gas-pressure in said heat-treating chamber, for controlling said heating-control means.

6. A heat-treating furnace comprising a divisible wall structure defining a substantially enclosed heat-treating chamber, liquid-sealing means between divisions of said wall structure, means for permeating said heat-treating chamber with a controlled atmosphere, energizable and deenergizable heating means for said heating chamber, heating control means, responsive to temperatures in said heating chamber, for controlling the energization and deenergization of said heating means so that the temperature in said heat-treating chamber follows a prearranged cycle including graduated temperature changes, and pressure-responsive means, responsive to the gas-pressure in said heating chamber, for controlling said heating control means, whereby the heating control means controls the heating means so that the gas-pressure within said heating chamber tends to remain below a preset limit.

JOHN G. HOOP.